(12) United States Patent
Smith

(10) Patent No.: US 7,003,913 B1
(45) Date of Patent: Feb. 28, 2006

(54) VEGETABLE CRADLE

(76) Inventor: Dudley Smith, 477 Coombs St., Napa, CA (US) 94559

( * ) Notice: Subject to any disclaimer, the term of this patent is extended or adjusted under 35 U.S.C. 154(b) by 0 days.

(21) Appl. No.: 10/959,381

(22) Filed: Oct. 6, 2004

(51) Int. Cl.
*A01G 17/04* (2006.01)
*A01G 13/02* (2006.01)

(52) U.S. Cl. ............................................ 47/44; 47/24.1
(58) Field of Classification Search .................. 47/44, 47/24.1, 39, 904; 56/329, 324, 327.1, 328.1; 46/20, 22; 168/44; 99/440, 441; 248/671, 248/346.02; 220/572
See application file for complete search history.

(56) References Cited

U.S. PATENT DOCUMENTS

| 66,807 | A | * | 7/1867 | Darling | 56/329 |
|---|---|---|---|---|---|
| 88,071 | A | * | 3/1869 | Perry | 56/329 |
| 395,947 | A | * | 1/1889 | Bradley | 56/329 |
| 1,290,008 | A | * | 12/1918 | Zwicker | 56/329 |
| 2,350,908 | A | * | 6/1944 | Langford | 56/329 |
| 2,667,117 | A | * | 1/1954 | Millard et al. | 99/418 |
| 4,140,340 | A | * | 2/1979 | Cloutier | 269/295 |
| 4,362,247 | A | * | 12/1982 | Rueda | 211/85.4 |
| 4,848,217 | A | * | 7/1989 | Koziol | 99/426 |
| 4,953,452 | A | * | 9/1990 | Tarlow | 99/344 |
| 5,474,188 | A | * | 12/1995 | McArdle | 211/85.4 |
| 5,848,522 | A | * | 12/1998 | Coviello, Jr. | 56/329 |
| 6,220,558 | B1 | * | 4/2001 | Broder et al. | 248/346.02 |

* cited by examiner

*Primary Examiner*—Son T. Nguyen
(74) *Attorney, Agent, or Firm*—Michael A. Shippey; Law Offices of Karla Shippey

(57) ABSTRACT

Vegetable Cradle with a rigid support platform that is radially curved when looking at an end view and straight and parallel to the ground when looking at a side view. A plurality of legs are attached the underside of the platform to keep the lowest portion of the platform approximately one inch off the ground. The platform has a plurality of ventilation slots and or apertures thereby allowing a fruit or vegetable to be ventilated. The platform is constructed of transparent material such as clear acrylic plastic. In a preferred embodiment, the legs include a broad foot to help prevent the legs from sinking into the ground.

6 Claims, 5 Drawing Sheets

VEGETABLE CRADLE

CROSS REFERENCE TO RELATED APPLICATIONS

Not Applicable

STATEMENT REGARDING FEDERALLY SPONSORED RESEARCH OR DEVELOPMENT

Not Applicable
Description of Attached Appendix
Not Applicable

BACKGROUND OF THE INVENTION

This invention relates generally to the field of plant growing accessories and more specifically to a vegetable Cradle. In the process of growing some vegetables and some fruits, especially those that grow on vines, there is a tenancy for some of the ripe vegetables or fruits to have contact with the ground. This condition can cause accelerated rot or bug infestation. Many gardeners use blocks of wood or stones to raise fruits or vegetables off the ground, however, these practices have deficiencies in that they may not provide adequate drainage which can make the problem of rot even worse. Additionally, these support members radiated heat back to the fruit or vegetable. This additional heat can also cause damage. Some attempts to remedy this problem have been proposed. Andrew Covielly, Jr. in his U.S. Pat. No. 5,848,522 proposed a cage or net to surround a plant so that when the vegetables grow, they are prevented from touching the ground. This design is problematic in that it must be installed at the initial planting of the fruit or vegetable and can not be easily adjusted to accommodate irregular sized plants. Additionally, when a gardener first plants a fruit or vegetable bearing vine such as a tomato, squash, or watermelon, he or she is not sure where the ripened fruit or vegetable will eventually reside. In a similar vein, Michael Chambers in his U.S. Pat. No. 4,348,831 discloses a structure which also must be placed in position when the plant is very young. In this case, a tomato vine is given a downwardly sloping radial support culminating in a radial trough. Tomatoes that grow to the point of touching the ground, instead are cradled by the trough. However, in this design there is a tenancy for heat build up as well as water retention, even though small holes at the bottom of the trough are disclosed, because the trough is essentially lying directly on the ground.

BRIEF SUMMARY OF THE INVENTION

The primary object of the invention is to provide a support structure device that lifts and cradles vegetables or fruits that grow close to the ground thereby reducing the chance for ground rot or bug infestation.

Another object of the invention is to provide a means to keep vegetables or fruits ventilated and relatively cool while growing near the ground.

Another object of the invention is to provide a means to use a plurality of cradles together to support larger fruits or vegetables.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a vegetable cradle comprising: a rigid support platform that is radially curved when looking at an end view and straight and parallel to the ground when looking at a side view, a plurality of legs attached the underside of said platform to keep the lowest portion of said platform approximately one inch off the ground, said platform having a plurality of ventilation slots and or apertures thereby allowing a fruit or vegetable to be ventilated, said platform being constructed of transparent material such as clear acrylic plastic.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
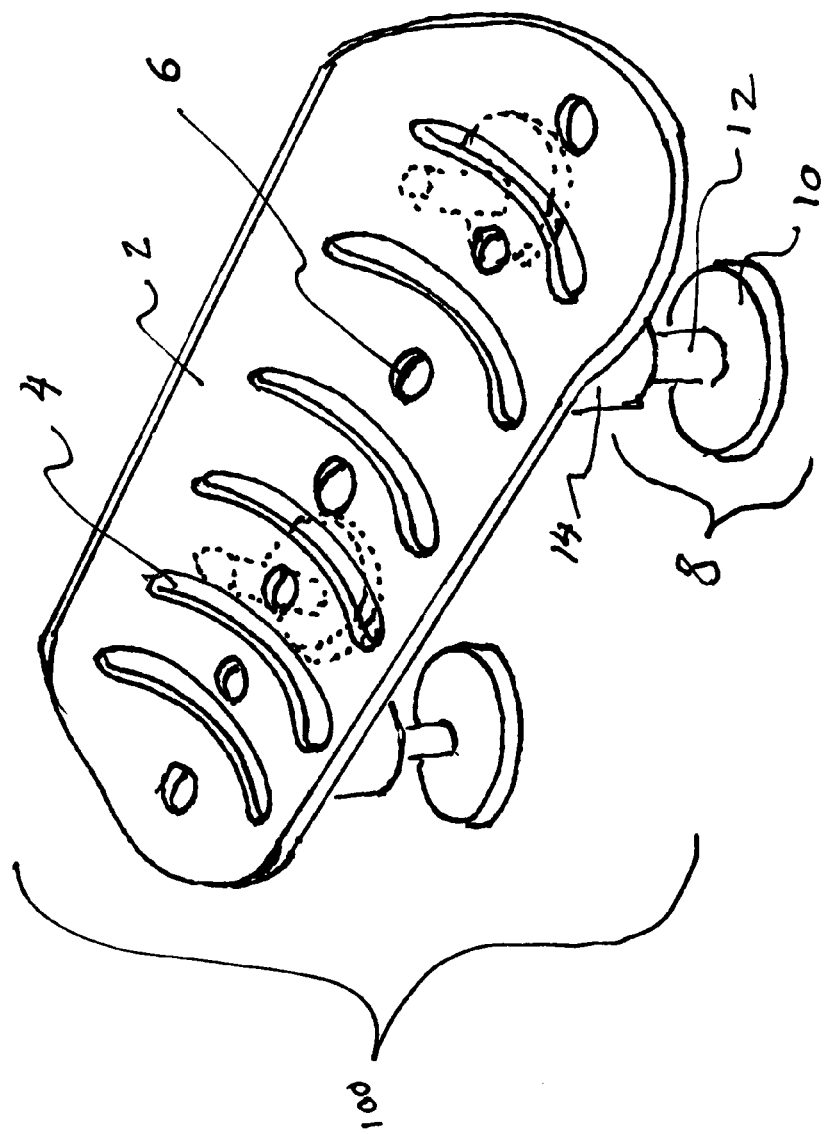
FIG. 1 is a perspective view of the invention.
Figure 2:
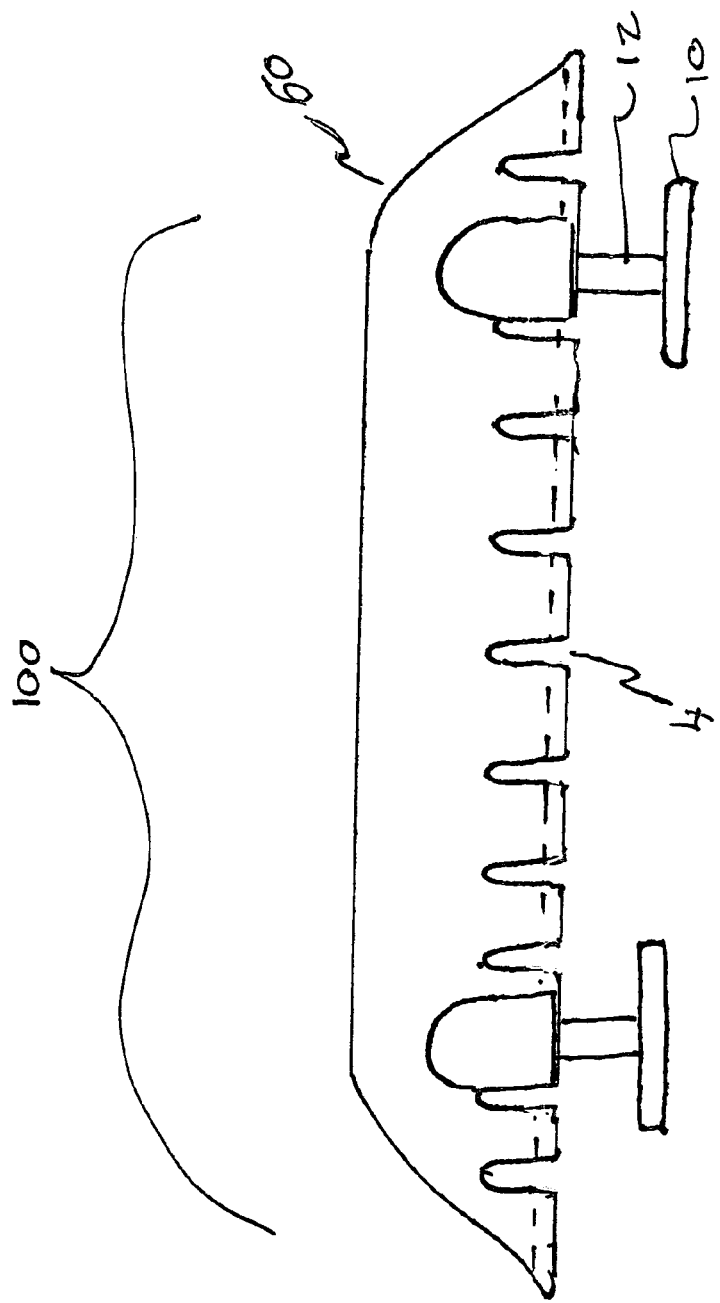
FIG. 2 is a side view of the invention.
Figure 3:
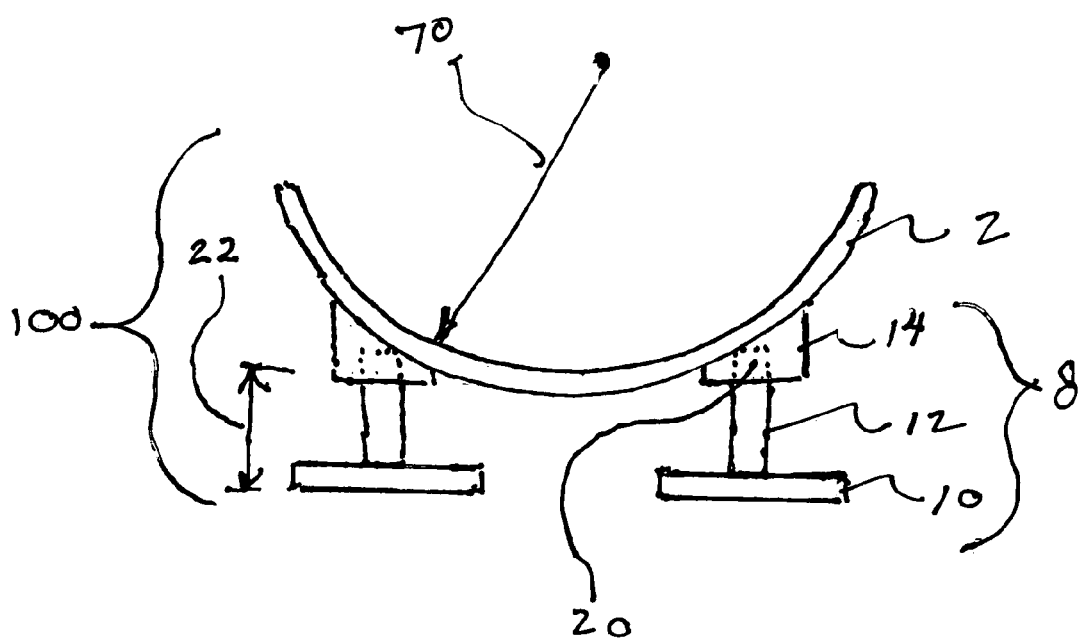
FIG. 3 is a front view of the invention.
Figure 4:
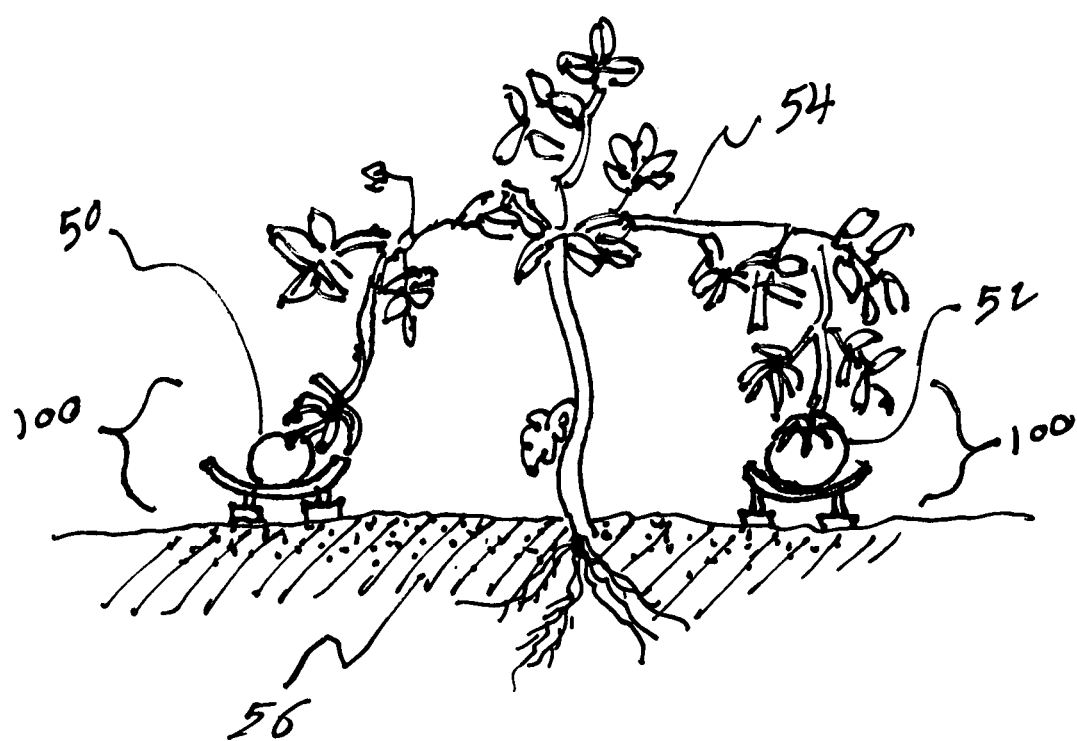
FIG. 4 is a side view of the invention in use.
Figure 5:
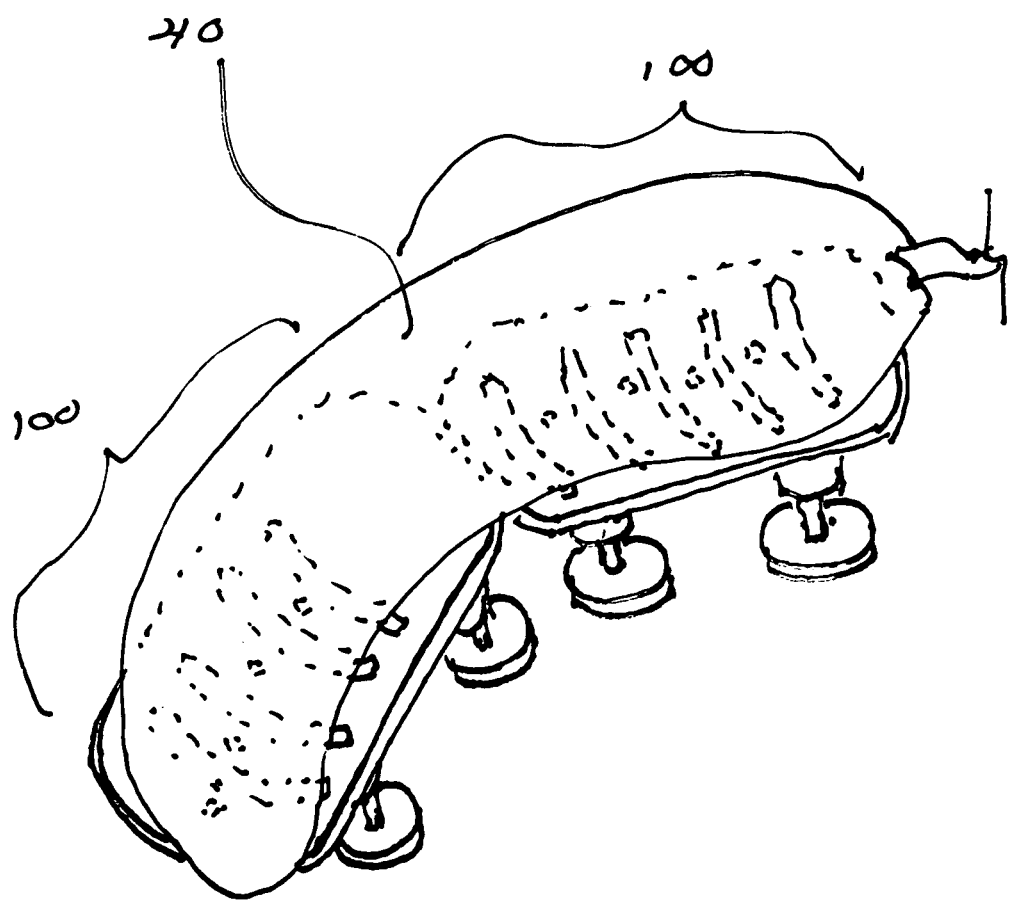
FIG. 5 is a perspective view of two units suporting a large vegetable.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Referring now to FIG. 1 we see a perspective view of the present invention 100. The support platform 2 is radiused as seen from the front end in FIG. 3. This cradle shape helps retain the fruit or vegetable being supported. The slots 4 and apertures 6 in the support platform 2 help ventilate the fruit or vegetable and also act as drain holes for rain water or the like. The support platform 2 is constructed of rigid transparent plastic such as acrylic so that hot rays from the sun are allowed to pass through the platform 2 so that a minimum of heat is reflected back to the fruit or vegetable being supported. The legs 8 support the platform 2 so that it is about one inch off the ground at its lowest point as shown in FIG. 3 as indicted by dimension arrow 22. Continuing with FIG. 3, the leg 8 is comprised of a retaining socket 14 that is molded into support plate 2, a post 12 and an integral foot 10. The foot 10 helps spread the weight thereby preventing the legs from sinking into soft soil. In the preferred embodiment, each leg post 12 can be inserted, as shown by dotted line 20, into retaining socket 14 so that a plurality of support platforms 2 can be nested on top of each other for compact packaging purposes. In the preferred embodiment, the radius of the floor of platform 2 is approximately two inches as shown by radius arrow 70. My experiments show that ideal width of the platform 2 is approximately four inches and the length is approximately nine inches. Obviously the design may be scaled up for larger items such as watermelon or large squash. FIG. 2 shows a side view of the present invention 100. The transition 60 from the end shape to the side shape is rounded so that support platforms can be placed next to each other at any desired angle to support larger vegetables 40 or fruit as shown in FIG. 5. FIG. 4 shows a side view of a tomato plant 54 growing in soil 56 where a pair of tomatoes 50, 52 are being supported by the present invention 100. In this way, the tomatoes 50, 52 are not as prone to ground rot or to infestation by ground dwelling bugs.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Vegetable Cradle comprising:
   a rigid support platform that is radially curved along its width, and straight in its length; further comprising a plurality of legs attached to the underside of said platform, said legs being sufficiently long so as to keep the lowest portion of said platform approximately one inch off the ground, and substantially parallel to the ground;
   said platform having a plurality of ventilation apertures thereby allowing a fruit or vegetable resting on said platform to be ventilated from the ambient air; said platform being constructed of transparent material;
   said platform further comprising a cross sectional radius of approximately two inches, a width of approximately four inches and a length of approximately nine inches, the right and left ends of said platform being rounded and blended into said straight sides.

2. Vegetable Cradle as claimed in claim 1 wherein each said leg includes a broad foot to help prevent said legs from sinking into the ground.

3. Vegetable Cradle as claimed in claim 1 wherein said support platform is of sufficient dimensions to support larger fruits and vegetables.

4. Vegetable Cradle as claimed in claim 1 wherein said legs are removable and replaceable so that a plurality of support platforms can be nested on top of each other for packaging purposes.

5. Vegetable Cradle as claimed in claim 1 wherein said support platform is comprised of clear acrylic plastic.

6. System for keeping vegetables raised off the ground while growing, said system comprising a plurality of vegetable cradles as described in claim 1 laid adjacent to each other, to accommodate and support a larger fruit or vegetable.

* * * * *